United States Patent
Takamura et al.

(10) Patent No.: US 6,548,034 B2
(45) Date of Patent: Apr. 15, 2003

(54) PROCESS FOR REDUCING CONCENTRATION OF CARBON MONOXIDE IN HYDROGEN-CONTAINING GAS

(75) Inventors: Koki Takamura, Niigata-ken (JP); Yasushi Hiramatsu, Niigata-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/734,888

(22) Filed: Dec. 13, 2000

(65) Prior Publication Data
US 2001/0004453 A1 Jun. 21, 2001

(30) Foreign Application Priority Data

| Dec. 21, 1999 | (JP) | ............................................ 11-363370 |
| Jan. 18, 2000 | (JP) | ...................................... 2000-008928 |
| Feb. 10, 2000 | (JP) | ...................................... 2000-033523 |
| Apr. 27, 2000 | (JP) | ...................................... 2000-127553 |

(51) Int. Cl.$^7$ .............................................. C01K 1/34
(52) U.S. Cl. .................................... 423/247; 423/437.2
(58) Field of Search ............................... 423/247, 437.2

(56) References Cited

U.S. PATENT DOCUMENTS

| 3,963,827 A | * | 6/1976 | Acres et al. ................. 423/239 |
| 4,191,733 A | * | 3/1980 | Swift et al. ................... 423/245 |
| 4,366,668 A | * | 1/1983 | Madgavkar et al. ....... 60/39.06 |
| 5,823,761 A | * | 10/1998 | Euzen et al. ..................... 431/7 |

FOREIGN PATENT DOCUMENTS

GB 1116585 6/1968

OTHER PUBLICATIONS

Patent Abstracts of Japan, Pub. No. 11114423, vol. 1999, No. 09 (Jul. 30, 1999).

\* cited by examiner

*Primary Examiner*—Stanley S. Silverman
*Assistant Examiner*—Edward M. Johnson
(74) *Attorney, Agent, or Firm*—Antonelli, Terry , Stout & Kraus, LLP

(57) ABSTRACT

In the present invention, carbon monoxide in the hydrogen-containing gas is contacted with oxygen in the presence of a catalyst comprising platinum and at least one metal selected from the group consisting of cobalt, nickel, copper and manganese.

24 Claims, 13 Drawing Sheets

EXAMPLE 1 (0.5% Co-0.5% Pt/alumina)

COMPARATIVE EXAMPLE 1 (0.5% Co/alumina)

COMPARATIVE EXAMPLE 2 (1.0% Pt/alumina)

Reaction temperature [°C]

-■- CO oxidation selectivity   -▲- Oxygen reaction rate   -◆- CO concentration

COMPARATIVE EXAMPLE 3 (1.0% Ru/alumina)

Reaction temperature [°C]

-■- CO oxidation selectivity   -▲- Oxygen reaction rate   -◆- CO concentration
-×- $CH_4$ concentration EXAMPLE 2 (basic nickel carbonate·0.5% Ni-0.5% Pt/alumina; SV=6152h$^{-1}$)

-■- CO oxidation selectivity    -▲- Oxygen reaction rate    -◆- CO concentration EXAMPLE 3 (nickel hydroxide·0.5% Ni-0.5% Pt/alumina; SV=6152h$^{-1}$)

-■- CO oxidation selectivity    -▲- Oxygen reaction rate    -◆- CO concentration EXAMPLE 4 (nickel hydroxide·1.0% Ni-0.5% Pt/alumina; SV=6152h$^{-1}$)

-■- CO oxidation selectivity  -▲- Oxygen reaction rate  -◆- CO concentration

EXAMPLE 4 (nickel hydroxide·1.0% Ni-0.5% Pt/alumina; SV=18885h$^{-1}$)

-■- CO oxidation selectivity  -▲- Oxygen reaction rate  -◆- CO concentration

EXAMPLE 5 (nickel nitrate·1.0% Ni-1.0% Pt/alumina; SV=6609h$^{-1}$)

-■- CO oxidation selectivity   -▲- Oxygen reaction rate   -♦- CO concentration

COMPARATIVE EXAMPLE 4 (basic nickel carbonate·1.0% Ni/alumina; SV=6152h$^{-1}$)

-■- CO oxidation selectivity   -▲- Oxygen reaction rate   -♦- CO concentration

COMPARATIVE EXAMPLE 5 (1.0% Pt/alumina; SV=6152h$^{-1}$)

-■- CO oxidation selectivity   -▲- Oxygen reaction rate   -♦- CO concentration

COMPARATIVE EXAMPLE 6 (1.0% Ru/alumina; SV=6152h$^{-1}$)

-■- CO oxidation selectivity   -▲- Oxygen reaction rate   -♦- CO concentration
-×- CH$_4$ concentration EXAMPLE 6 (0.25% Cu-0.75% Pt/alumina)

- ■ - CO combustion selectivity    - ▲ - Oxygen conversion rate
- ◆ - CO concentration at outlet EXAMPLE 7 (0. 5% Cu-0. 5% Pt/alumina)

- ■ - CO combustion selectivity    - ▲ - Oxygen conversion rate
- ◆ - CO concentration at outlet EXAMPLE 8 (0.75% Cu-0.25% Pt/alumina)

- -■- CO combustion selectivity  -▲- Oxygen conversion rate
- -◆- CO concentration at outlet EXAMPLE 9 (0.5% Pt/Cu-Zn-Al)

- -■- CO combustion selectivity  -▲- Oxygen conversion rate
- -◆- CO concentration at outlet COMPARATIVE EXAMPLE 7 (1.0% Cu/alumina)

COMPARATIVE EXAMPLE 8 (1.0% Pt/alumina)

COMPARATIVE EXAMPLE 9 (1.0% Pt/alumina)

-■- CO combustion selectivity  -▲- Oxygen conversion rate
-◆- CO concentration at outlet COMPARATIVE EXAMPLE 10 (1.0% Ru/alumina)

-■- CO combustion selectivity  -▲- Oxygen conversion rate
-◆- CO concentration at outlet  -×- $CH_4$ concentration at outlet COMPARATIVE EXAMPLE 11 (Cu-Zn-Al)

- ■ - CO combustion selectivity   - ▲ - Oxygen conversion rate
- ◆ - CO concentration at outlet EXAMPLE 10 (0.5% Mn-0.5% Pt/alumina; oxygen concentration: 0.5%; SV=6039h$^{-1}$)

- □ - CO oxidation selectivity   - ▲ - Oxygen reaction rate   - ◆ - CO concentration EXAMPLE 11 (0.5% Mn-0.5% Pt/alumina; oxygen concentration: 0.75%; SV=6039h$^{-1}$)

COMPARATIVE EXAMPLE 12 (0.5% Mn/alumina; SV=6039h$^{-1}$)

COMPARATIVE EXAMPLE 13 (1.0% Pt/alumina; SV=6152h$^{-1}$)

-□- CO oxidation selectivity   -▲- Oxygen reaction rate   -◆- CO concentration

COMPARATIVE EXAMPLE 14 (1.0% Ru/alumina; SV=6152h$^{-1}$)

-□- CO oxidation selectivity   -▲- Oxygen reaction rate   -◆- CO concentration

PROCESS FOR REDUCING CONCENTRATION OF CARBON MONOXIDE IN HYDROGEN-CONTAINING GAS

BACKGROUND OF THE INVENTION

1. Field of the Invention

The present invention relates to a process for reducing a concentration of carbon monoxide in a hydrogen-containing gas using a catalyst, and a catalyst used therefor. More particularly, the invention relates to a process for reducing a concentration of carbon monoxide in a hydrogen-containing gas prepared by reforming hydrocarbons, methanol, etc., which is contemplated to be used as a hydrogen source of fuel cells.

2. Prior art

Hydrogen-containing gases have been produced by subjecting hydrocarbons, methanol or the like to steam-reforming, and used as raw materials for various organic chemical products. Recently, particular attention has been paid to the use of these hydrogen-containing gases as a hydrogen source of fuel cells.

However, these hydrogen-containing gases inevitably contain carbon monoxide. When such hydrogen-containing gases are used as a hydrogen source of fuel cells, the carbon monoxide is absorbed onto a platinum catalyst contained in electrodes of the fuel cell, resulting in deteriorated activity of the catalyst. Therefore, it is required to reduce a carbon monoxide concentration in the gas to a level as low as possible. The acceptable concentration of carbon monoxide in the gas is, e.g., several % or lower when used in phosphoric acid-type fuel cells, or several tens ppm or lower when used in solid polymer-type fuel cells.

Methanol can be reformed with steam at a relatively low temperature. The resultant reformed gas has a low content of carbon monoxide and, therefore, can be advantageously used as a hydrogen source of fuel cells. For this reason, many attempts have been made to develop fuel cells using methanol as a raw material, especially those installable in automobiles.

As to methods of reducing a carbon monoxide concentration in the hydrogen-containing gas by oxidizing the carbon monoxide into carbon dioxide using a catalyst, Japanese Patent Application Laid-Open No. 5-245376 discloses the method of converting carbon monoxide into carbon dioxide in the presence of steam using a catalyst composed of copper oxide, aluminum oxide and magnesium oxide. Japanese Patent Application Laid-Open No. 8-295502 discloses the method of selectively oxidizing and removing carbon monoxide using a catalyst composed of metal oxide and gold superfine particles dispersed and supported on the metal oxide. Japanese Patent Application Laid-Open No. 9-30802 discloses the apparatus for reducing a carbon monoxide concentration in a hydrogen-containing gas produced by reforming methanol using a platinum/ruthenium catalyst. Japanese Patent Application Laid-Open No. 11-102719 discloses the apparatus for selectively oxidizing carbon monoxide contained in a hydrogen-rich gas using a catalyst prepared by adding ruthenium to alkali metal.

SUMMARY OF THE INVENTION

However, in the above conventional method using the catalyst composed of copper oxide, aluminum oxide and magnesium oxide (Japanese Patent Application Laid-Open No. 5-245376), the reaction temperature is as high as 300 to 400° C., and the conversion rate of carbon monoxide is low. In the method using the catalyst composed of metal oxide and gold superfine particles dispersed and supported on the metal oxide (Japanese Patent Application Laid-Open No. 8-295502), although the reaction can be conducted at a low temperature, the catalyst used therein is too expensive. In the method using the platinum/ruthenium catalyst (Japanese Patent Application Laid-Open No. 9-30802) or the method using the catalyst prepared by adding ruthenium to alkali metal (Japanese Patent Application Laid-Open No. 11-102719), these catalysts are also too expensive, and a part of carbon monoxide tends to be reacted with hydrogen to form methane. The formation of methane (methanation) not only consumes a large amount of hydrogen, but also generates a large amount of heat upon the reaction between carbon monoxide and hydrogen, thereby causing significant increase in temperature and making it difficult to control the reaction temperature.

An object of the present invention is to provide a process for effectively reducing a carbon monoxide concentration in a hydrogen-containing gas obtained by reforming methanol or the like for the purpose of developing fuel cells, and a catalyst used therefor.

As a result of extensive researches concerning process for reducing a carbon monoxide concentration in a hydrogen-containing gas, the present inventors have found that a carbon monoxide concentration in the hydrogen-containing gas is effectively reduced by contacting the carbon monoxide with oxygen in the presence of a catalyst comprising platinum and at least one metal selected from the group consisting of cobalt, nickel, copper and manganese. The present invention has been accomplished based on this finding.

Namely, in accordance with the present invention, there are provided a process for reducing a concentration of carbon monoxide in a hydrogen-containing gas which comprises the step of contacting the carbon monoxide with oxygen in the presence of a catalyst comprising platinum and at least one metal selected from the group consisting of cobalt, nickel, copper and manganese; and a catalyst for reducing a concentration of carbon monoxide, comprising a support and a catalyst component which is supported on the support and comprises platinum and at least one metal selected from the group consisting of cobalt, nickel, copper and manganese.

DETAILED DESCRIPTION OF THE INVENTION

Figure 1:
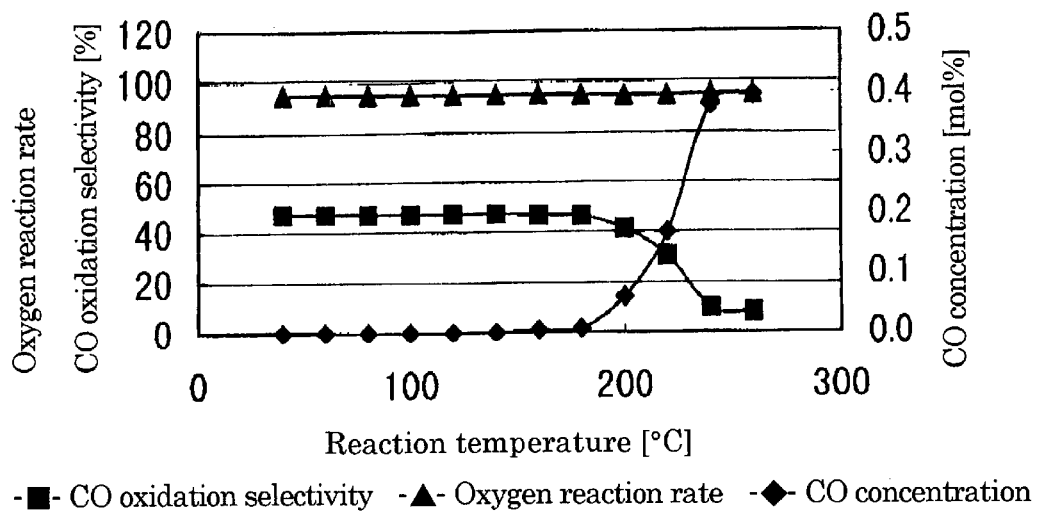
FIG. 1 is a graph showing results of performance evaluation of a catalyst used in EXAMPLE 1.

The hydrogen-containing gas used as a raw material in the present invention is not restricted to particular ones, but is usually produced by subjecting hydrocarbons or methanol to steam-reforming or partial oxidation.

As the hydrocarbons, there may be used natural gases composed mainly of methane, liquefied petroleum gases, naphtha, light oils or the like. The steam-reforming of the hydrocarbons may be conducted in a furnace at a temperature of 800 to 1,000° C. using a nickel-based catalyst to produce a synthetic gas containing hydrogen, carbon monoxide and carbon dioxide as main components.

The hydrogen-containing gas used as a raw material in the present invention may be prepared by converting carbon monoxide contained in the thus produced synthetic gas into carbon dioxide using iron-based catalysts or copper-based catalysts, and may usually contain carbon monoxide in an amount of about 1 mol %.

The steam-reforming of methanol may be conducted at a temperature of about 200 to 350° C. using copper/zinc-based catalysts or noble metal-based catalysts containing Pd, Pt or the like to produce a synthetic gas containing hydrogen and carbon dioxide as main components. In general, the synthetic gases produced by using the noble metal-based catalysts contain carbon monoxide in an amount of about 1 to 5 mol %, and those produced by using the copper/zinc-based catalysts contain carbon monoxide in an amount of 1 mol % or lower. In the present invention, these synthetic gases can be directly used as the hydrogen-containing gas to be treated.

In the process of the present invention, an oxygen-containing gas is added to the hydrogen-containing gas as a raw material, and then these gases are reacted with each other in the presence of a catalyst comprising platinum and at least one metal selected from the group consisting of cobalt, nickel, copper and manganese. As a result, carbon monoxide contained in the hydrogen-containing gas is selectively oxidized into carbon dioxide, thereby reducing a concentration of carbon monoxide in the hydrogen-containing gas.

The catalyst composition containing platinum and at least one metal selected from the group consisting of cobalt, nickel, copper and manganese as catalytic active components, may be in the form of either a coprecipitated catalyst or a supported catalyst. The coprecipitated catalysts may be produced by precipitating the respective catalyst components from an aqueous solution containing at least one metal selected from the group consisting of cobalt, nickel, copper and manganese together with platinum, e.g., using alkali carbonate as a precipitant. The supported catalysts may be appropriately produced, e.g., by the following method. That is, a slurry containing at least one metal selected from the group consisting of cobalt, nickel, copper and manganese in a precipitated state, is mixed with a slurry containing a support component, and then the mixed slurry is carbonated with a carbon dioxide gas to prepare a catalyst. Then, a platinum-containing component is supported on the thus prepared catalyst. As the catalyst supports, there may be suitably used those having a large surface area, such as alumina and silica. The order and method of supporting the respective catalytic active components on the catalyst support are not particularly restricted. For this purpose, any suitable known methods such as impregnation and precipitation may be used alone or in combination.

In order to apply the catalyst of the present invention to fuel cells installed in automobiles, the catalyst is preferably in the form of a supported catalyst prepared by supporting platinum and at least one metal selected from the group consisting of cobalt, nickel, copper and manganese on the catalyst support.

In the catalyst of the present invention, the content of at least one metal selected from the group consisting of cobalt, nickel, copper and manganese is 0.1 to 80 wt. %, preferably 0.5 to 50 wt. %, and the content of platinum is 0.05 to 50 wt. %, preferably 0.2 to 5 wt. %.

The selective oxidation of carbon monoxide may be conducted under the following reaction conditions. When cobalt, nickel or manganese is used together with platinum as catalyst components, the reaction temperature is usually in the range of 40 to 200° C., preferably 60 to 160° C., and the amount of oxygen added to the hydrogen-containing gas is 0.5 to 4 times, preferably 0.5 to 2 times the amount of carbon monoxide contained in the hydrogen-containing gas. The reaction pressure is in the range of from about ordinary pressure to about 20 atm (about 0.1 to 2 MPa). The amount of the catalyst used in the selective oxidation is 100 to 100,000 [1/h], preferably 1,000 to 50,000 [1/h] in terms of a gas hourly space velocity (GHSV).

When copper is used together with platinum as catalyst components, the reaction temperature is usually in the range of 100 to 200° C., preferably 120 to 160° C. The amount of oxygen added to the raw reformed gas is 0.5 to 4 times, preferably 0.5 to 2 times the amount of carbon monoxide contained in the reformed gas. The reaction pressure is in the range of about ordinary pressure to about 20 atm. The amount of the catalyst used is 100 to 100,000 [1/h], preferably 1,000 to 50,000 [1/h] in terms of a gas hourly space velocity (GHSV).

The catalyst used in the process of the present invention which comprises platinum and at least one metal selected from the group consisting of cobalt, nickel, copper and manganese, exhibits a high oxygen reaction rate and an extremely high CO oxidation selectivity at a low temperature. That is, substantially no methanation reaction between carbon monoxide and hydrogen is caused at a temperature of 260° C. or lower.

Also, when cobalt or nickel is used together with platinum as catalyst components, the reverse shift reaction between a carbon dioxide gas and hydrogen is prevented from occurring at a temperature of 200° C. or lower. The selectivity to the carbon dioxide gas production reaction due to oxidation of carbon monoxide is 50% or higher based on the amount of oxygen consumed. When copper is used together with platinum as catalyst components, the reverse shift reaction between a carbon dioxide gas and hydrogen is prevented from occurring at a temperature of 160° C. or lower, and the selectivity to the carbon dioxide gas production reaction due to oxidation of carbon monoxide is 40% or higher based on the amount of oxygen consumed. Further, when manganese is used together with platinum as catalyst components, the reverse shift reaction between a carbon dioxide gas and hydrogen is prevented from occurring at a temperature of 200° C. or lower, and the selectivity to the carbon dioxide gas production reaction due to oxidation of carbon monoxide is 40% or higher based on the amount of oxygen consumed.

In the process of the present invention, when cobalt is used together with platinum as catalyst components, and a hydrogen-containing gas being produced by steam-reforming methanol and containing CO in an amount of about 1 mol % is treated with such a catalyst, the CO concentration in the hydrogen-containing gas is reduced to 0.1 mol % or lower at a relatively low temperature ranging from about 30 to 200° C., and the amount of hydrogen burned is extremely small. In particular, when the hydrogen-containing gas is treated with the catalyst in a temperature range of about 40 to 180° C., it is possible to further reduce the CO concentration to 0.01 mol % or lower. As a result, the hydrogen-containing gases treated with the catalyst at a temperature of about 30 to 200° C. by the process of the present invention are directly applied to phosphoric acid-type fuel cells, and those treated with the catalyst at a temperature of about 40 to 180° C. are directly applied to solid polymer-type fuel cells.

When nickel is used together with platinum as catalyst components, and a hydrogen-containing gas being produced by steam-reforming methanol and containing CO in an amount of about 1 mol % is treated with such a catalyst, the CO concentration in the hydrogen-containing gas is reduced to 0.1 mol % or lower at a relatively low temperature ranging from about 50 to 200° C., and the amount of hydrogen burned is extremely small. In particular, when the hydrogen-containing gas is treated with the catalyst in a temperature range of about 80 to 160° C., it is possible to further reduce the CO concentration to 0.01 mol % or lower. As a result, the hydrogen-containing gases treated with the catalyst at a temperature of about 50 to 200° C. by the process of the present invention are directly applied to phosphoric acid-type fuel cells, and those treated with the catalyst at a temperature of about 80 to 160° C. are applied to solid polymer-type fuel cells directly or subsequently through an adsorbent.

When copper is used together with platinum as catalyst components, and a hydrogen-containing gas being produced by steam-reforming methanol and containing CO in an amount of about 1 mol % is treated with such a catalyst, the CO concentration in the hydrogen-containing gas is reduced to 0.1 mol % or lower at a relatively low temperature ranging from about 120 to 160° C., and the amount of hydrogen burned is extremely small. As a result, the hydrogen-containing gases treated with the catalyst at a temperature of about 120 to 160° C. by the process of the present invention are directly applied to phosphoric acid-type and solid polymer-type fuel cells.

When manganese is used together with platinum as catalyst components, and a hydrogen-containing gas being produced by steam-reforming methanol and containing CO in an amount of about 1 mol % is treated with such a catalyst, the CO concentration in the hydrogen-containing gas is reduced to 0.1 mol % or lower at a relatively low temperature ranging from about 50 to 200° C., and the amount of hydrogen burned is extremely small. As a result, the hydrogen-containing gases treated with the catalyst at a temperature of about 50 to 200° C. by the process of the present invention are extremely suitably applied to phosphoric acid-type fuel cells.

Accordingly, the hydrogen-containing gases treated with any of the above-described catalysts by the process of the present invention are extremely suitable for use in fuel cells such as those installed in automobiles.

As is apparent from the above preferred embodiments, in accordance with the process of the present invention, it is possible to reduce the CO concentration of the hydrogen-containing gas being produced by steam-reforming methanol and containing CO in an amount of about 1 mol %, to 0.1 mol % or lower at a relatively low temperature, and also reduce the hydrogen loss occurring upon the treatment to an extremely low level.

Thus, since the hydrogen-containing gases treated by the process of the present invention are extremely suitable for use in fuel cells such as those installed in automobiles, the present invention is considerably valuable from industrial viewpoints.

The present invention will be described in more detail by reference to the following examples. However, it should be noted that the following examples are illustrative and not intended to limit the invention thereto.

Meanwhile, in EXAMPLES 1–5 and 10, and COMPARATIVE EXAMPLES 1–6 and 12–14, the performance evaluation of the catalysts obtained therein was conducted using as a raw gaseous material an oxygen-containing reformed gas containing 0.5 mol % of CO, 0.5 mol % of $O_2$, 24 mol % of $CO_2$ and 75 mol % of $H_2$ (molar ratio of $O_2$ to CO:1.0); in EXAMPLES 6–9 and COMPARATIVE EXAMPLES 7–11, the performance evaluation of the catalysts obtained therein was conducted using as a raw gaseous material an oxygen-containing reformed gas containing 0.5 to 1.0 mol % of CO, 0.5 to 1.0 mol % of $O_2$, 25 mol % of $CO_2$ and 73 to 74 mol % of $H_2$; and in EXAMPLE 11, the performance evaluation of the catalyst obtained therein was conducted using as a raw gaseous material an oxygen-containing reformed gas containing 0.5 mol % of CO, 0.75 mol % of $O_2$, 25 mol % of $CO_2$ and 73.75 mol % of $H_2$ (molar ratio of $O_2$ to CO:1.5).

Further, in EXAMPLES 1–5 and 10, and COMPARATIVE EXAMPLES 1–6 and 12–14, the compositions of treated gases obtained after the reaction was conducted at a predetermined space velocity (SV) under ordinary pressure while varying the reaction temperature between 40 and 260° C., were analyzed by gas chromatograph; and in EXAMPLES 6–9 and COMPARATIVE EXAMPLES 7–11, the compositions of treated gases obtained after the reaction was conducted at a space velocity (SV) of 5,000 to 11,500 $hr^{-1}$ under ordinary pressure while varying the reaction temperature between 40 and 260° C., were analyzed by gas chromatograph.

In the respective figures showing the results of performance evaluation of the catalysts, "oxygen reaction rate" represents a reaction (conversion) percentage of oxygen contained in the raw gas to be treated; and "CO oxidation selectivity" represents a percentage of the amount of oxygen contributed to CO oxidation reaction based on a total amount of oxygen reacted. Incidentally, substantially whole amount of the oxygen not contributed to CO oxidation reaction was consumed for combustion of hydrogen.

EXAMPLE 1

An aqueous solution in which cobalt acetate dihydrate was dissolved in an amount of 0.5 wt. % in terms of Co, and commercially available alumina balls (average diameter: 1.5 mm; BET specific surface area: 200 to 240 $m^2/g$) were placed in an evaporator and dried under reduced pressure to support 0.5 wt. % of Co on the alumina support, followed by further drying. Then, an acetone solution containing acetylacetonato platinum in an amount of 0.5 wt. % in terms of Pt was charged into an evaporator together with the thus obtained Co-supporting alumina, and dried under reduced pressure to further support 0.5 wt. % of platinum on the alumina support. The resultant Co/Pt-supporting alumina was dried and then calcined at 360° C. to obtain an alumina-supported catalyst on which 0.5 wt. % of Co and 0.5 wt. % of Pt were supported.

The results of performance evaluation (SV=13,000 [1/h]) of the thus obtained catalyst are shown in FIG. 1. When using the above catalyst, no methane was produced at a temperature of 40 to 260° C., and the CO concentration of the treated gas was reduced to 0.05 mol % or lower in a reaction temperature range of about 40 to 190° C. Further, in the above temperature range, the oxygen reaction rate was 90% or higher, and the CO oxidation selectivity was about 50%.

COMPARATIVE EXAMPLE 1

Figure 2:
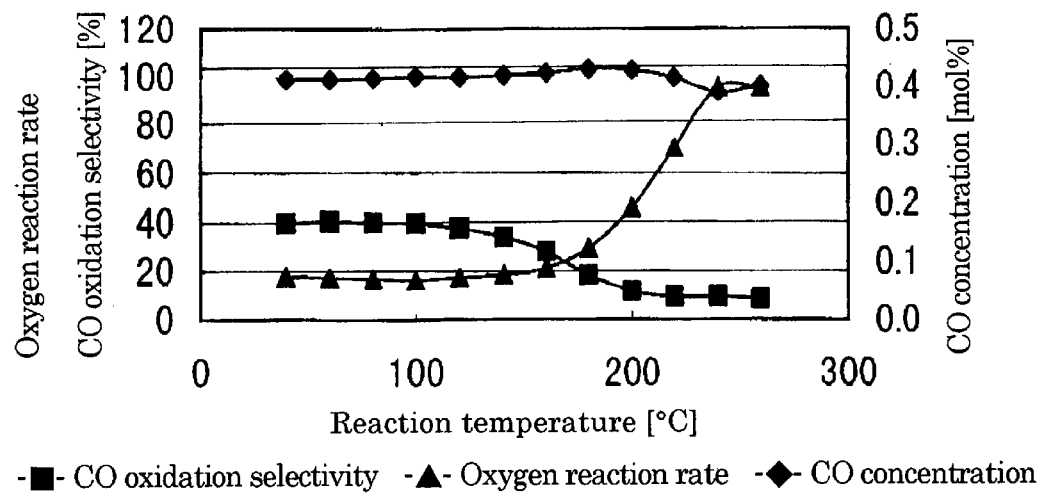
FIG. 2 is a graph showing results of performance evaluation of a catalyst used in COMPARATIVE EXAMPLE 1.

A 0.5 wt. % Co/alumina catalyst was prepared by the same method as described in EXAMPLE 1 except that no platinum was supported on the catalyst. The thus obtained catalyst was used in the reaction under the same conditions as described in EXAMPLE 1 (SV=13,000 [1/h]). The results are shown in FIG. 2.

When using the above catalyst, although no methane was produced in a temperature range of 40 to 260° C., the oxygen reaction rate of 80% or higher could not be achieved unless the reaction temperature was raised to about 230° C. or higher. Also, it was confirmed that the CO oxidation selectivity was 40% or lower, and the CO concentration of the treated gas could not be reduced to 0.4 mol % or lower.

COMPARATIVE EXAMPLE 2

Figure 3:
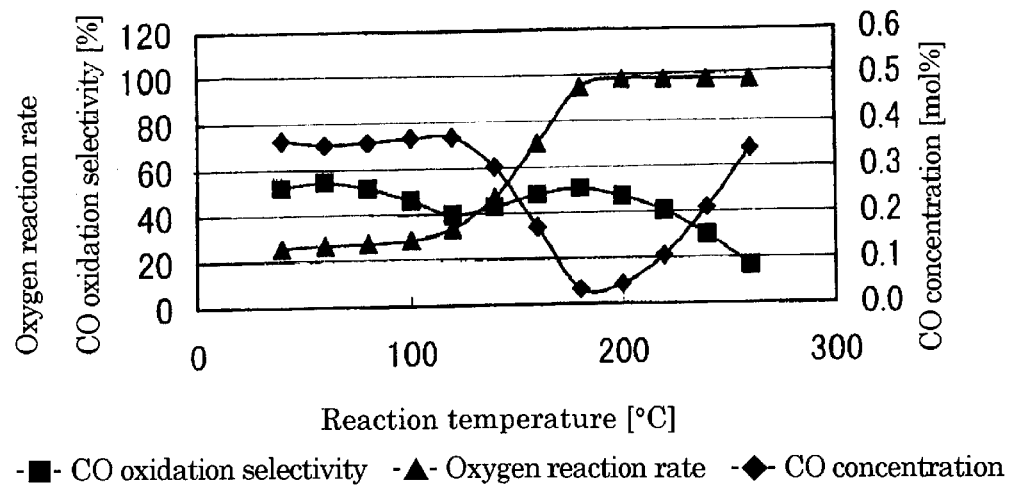
FIG. 3 is a graph showing results of performance evaluation of a catalyst used in COMPARATIVE EXAMPLE 2.

A 1.0 wt. % Pt/alumina catalyst was prepared by the same method as described in EXAMPLE 1 except that no cobalt was supported on the catalyst. The thus obtained catalyst was used in the reaction under the same conditions as described in EXAMPLE 1 (SV=13,000 [1/h]). The results are shown in FIG. 3.

When using the above catalyst, the oxygen reaction rate of 80% or higher could not be achieved unless the reaction temperature was raised to about 170° C. or higher. Also, it was confirmed that the CO oxidation selectivity was 55% or lower, and the CO concentration of the treated gas was 0.1 mol % or lower in a temperature range of about 170 to 220° C., but could not be reduced to 0.03 mol % or lower in this temperature range.

COMPARATIVE EXAMPLE 3

Figure 4:
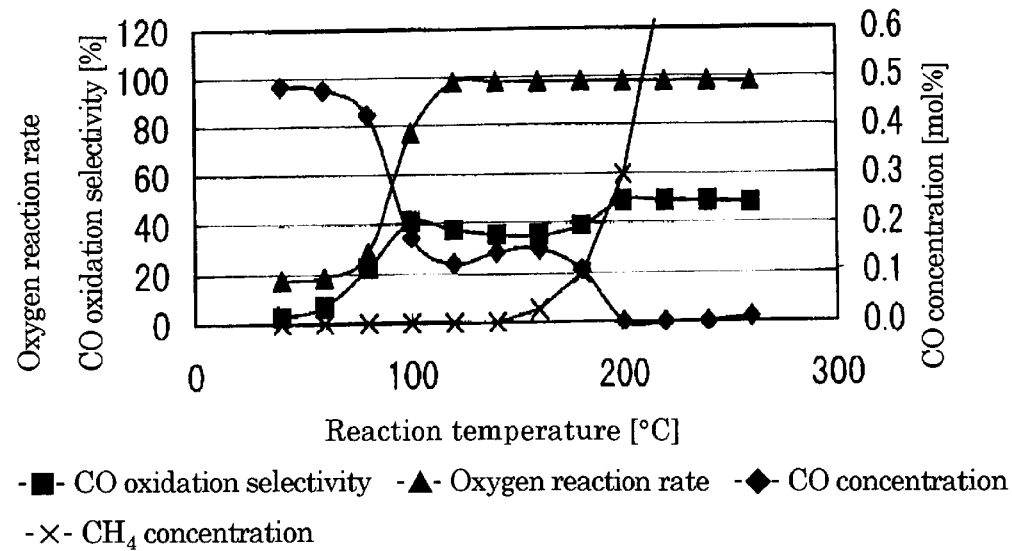
FIG. 4 is a graph showing results of performance evaluation of a catalyst used in COMPARATIVE EXAMPLE 3.

A 1.0 wt. % Ru/alumina catalyst was prepared by the same method as described in EXAMPLE 1 except that no cobalt was supported on the catalyst, and acetylacetonato ruthenium was used instead of acetylacetonato platinum. The thus obtained catalyst was used in the reaction under the same conditions as described in EXAMPLE 1 (SV=13,000 [1/h]). The results are shown in FIG. 4.

When using the above catalyst, methane was produced at a temperature of 150° C. or higher, and the amount of methane produced was rapidly increased with the temperature rise. Further, the oxygen reaction rate of 80% or higher could not be achieved unless the reaction temperature was raised to about 100° C. or higher. It was also confirmed that the CO oxidation selectivity was 50% or lower, and the CO concentration of the treated gas could not be reduced to 0.05 mol % or lower unless the reaction temperature was raised to about 190° C. or higher.

Consequently, it was recognized that the thus obtained catalyst was incapable of effectively utilizing oxygen for reducing the CO concentration, and if used at an elevated temperature, a large amount of hydrogen was consumed due to production of methane or combustion of hydrogen.

EXAMPLE 2

Commercially available alumina balls (average diameter: 1.5 mm; BET specific surface area: 200 to 240 $m^2/g$) were added into an aqueous solution of nickel nitrate hexahydrate, and the resultant mixture was stirred. Then, an excessive amount of an aqueous sodium carbonate solution was added to the mixture to precipitate basic nickel carbonate in an amount of 0.5 wt. % in terms of Ni, on the alumina support. The thus obtained Ni-supporting alumina was filtered and then dried. Thereafter, the Ni-supporting alumina was charged into an evaporator together with an acetone solution containing acetylacetonato platinum in an amount of 0.5 wt. % in terms of Pt, and dried under reduced pressure to further support 0.5 wt. % of platinum on the alumina support. The resultant Ni/Pt-supporting alumina was dried and then calcined at 400° C. to obtain an alumina-supported catalyst on which 0.5 wt. % of Ni and 0.5 wt. % of Pt were supported.

Figure 5:
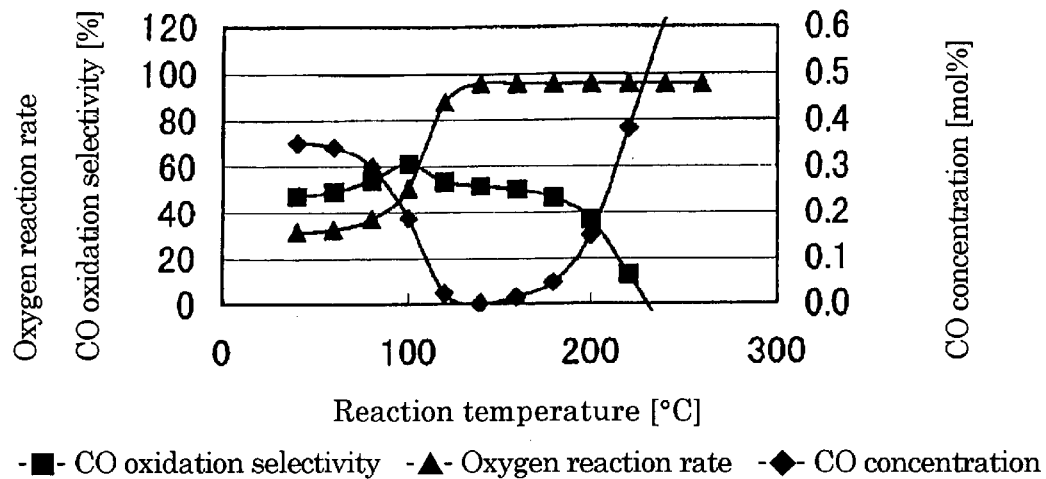
FIG. 5 is a graph showing results of performance evaluation of a catalyst used in EXAMPLE 2.

The results of performance evaluation (SV=6,152 [1/h]) of the thus obtained catalyst are shown in FIG. 5. When using the above catalyst, no methane was produced at a temperature of 40 to 260° C., and the CO concentration of the treated gas was reduced to 0.05 mol % or lower in a reaction temperature range of about 115 to 190° C. Further, in the above temperature range, the oxygen reaction rate was 80% or higher, and the CO oxidation selectivity was about 40 to 60%.

EXAMPLE 3

Figure 6:
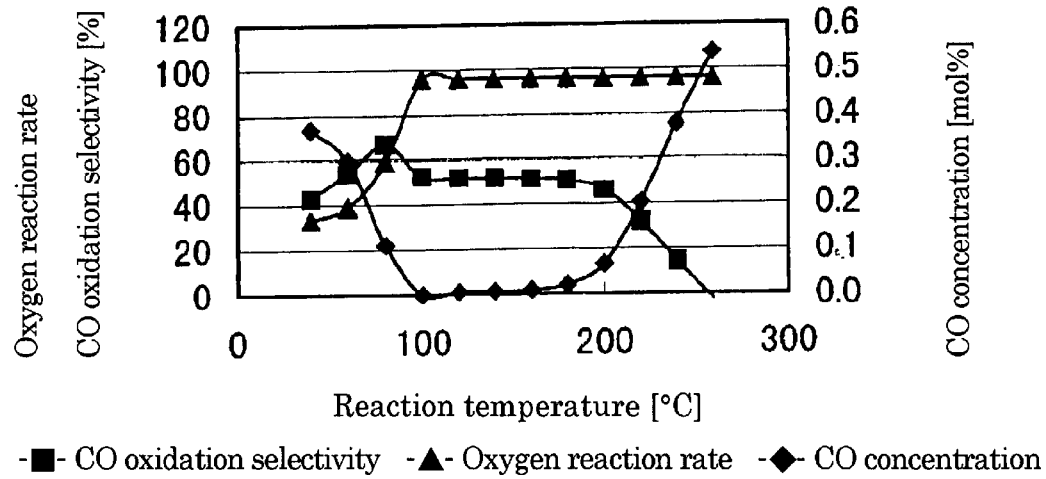
FIG. 6 is a graph showing results of performance evaluation of a catalyst used in EXAMPLE 3.

An alumina-supported catalyst on which 0.5 wt. % of Ni and 0.5 wt. % of Pt were supported, was prepared by the same method as described in EXAMPLE 2 except that an aqueous sodium hydroxide solution was used instead of the aqueous sodium carbonate solution. The thus obtained catalyst was used in the reaction under the same conditions as described in EXAMPLE 2. The results of performance evaluation (SV=6,152 [1/h]) of the catalyst are shown in FIG. 6.

When using the above catalyst, no methane was produced at a temperature of 40 to 260° C., and the CO concentration of the treated gas was reduced to 0.05 mol % or lower in the reaction temperature range of about 90 to 190° C. Further, in the above reaction temperature range, the oxygen reaction rate was 80% or higher, and the CO oxidation selectivity was about 45 to 60%.

EXAMPLE 4

Figure 7:
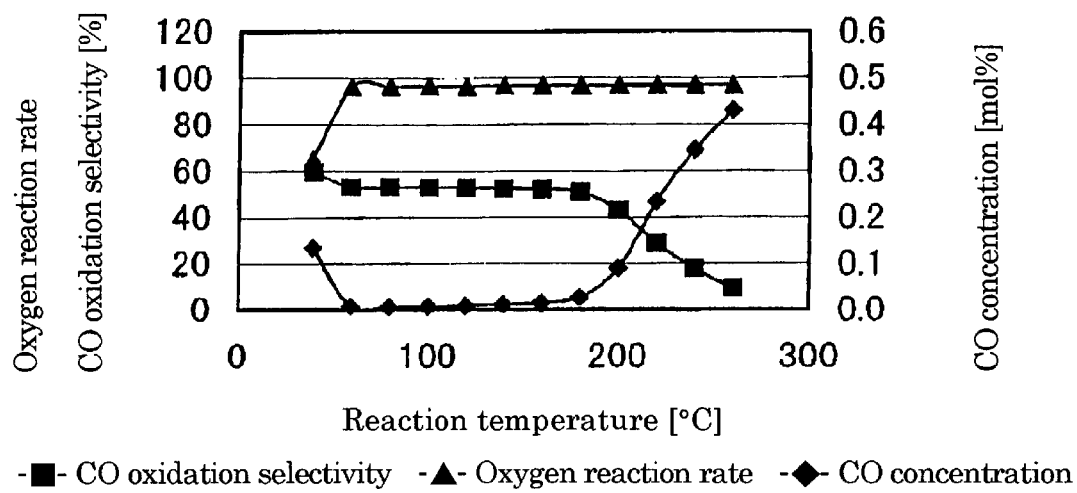
FIG. 7 is a graph showing results of performance evaluation (SV: 6152 [1/h]) of a catalyst used in EXAMPLE 4.
Figure 8:
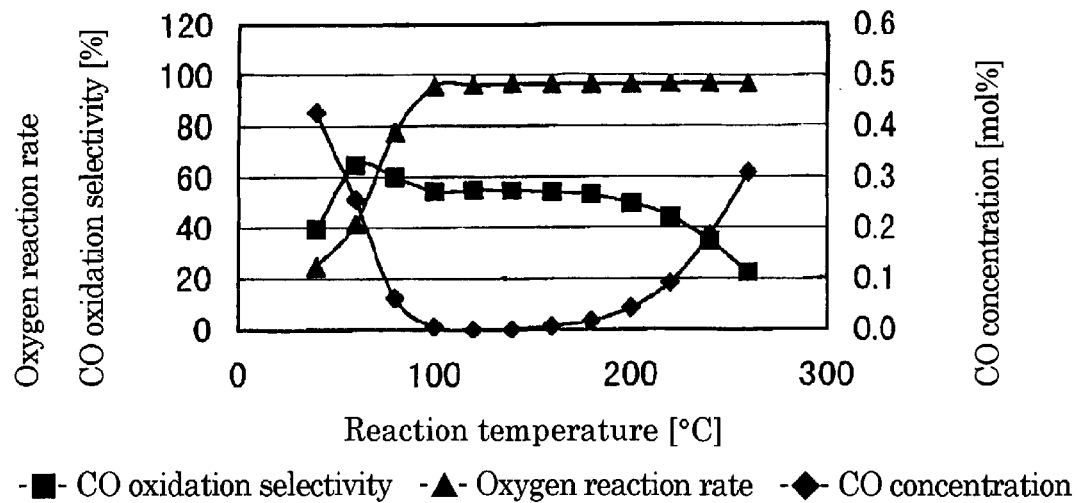
FIG. 8 is a graph showing results of performance evaluation (SV: 18,885 [1/h]) of a catalyst used in EXAMPLE 4.

An alumina-supported catalyst on which 1.0 wt. % of Ni and 0.5 wt. % of Pt were supported, was prepared by the same method as described in EXAMPLE 3, and used in the reaction under the same conditions as described in EXAMPLE 3. The results of performance evaluation of the catalyst are shown in FIG. 7 (SV=6,152 [1/h]) and FIG. 8 (SV=18,885 [1/h]).

When using the above catalyst, no methane was produced at a temperature of 40 to 260° C. In addition, the CO concentration of the treated gas was reduced to 0.05 mol % or lower in the reaction temperature range of about 50 to 190° C. at a space velocity (SV) of about 6,000 [1/h], and in the reaction temperature range of about 90 to 200° C. at a space velocity (SV) of about 19,000 [1/h], respectively. Further, in the above reaction temperature ranges, the oxygen reaction rate was 80% or higher, and the CO oxidation selectivity was about 50 to 55%.

EXAMPLE 5

Figure 9:
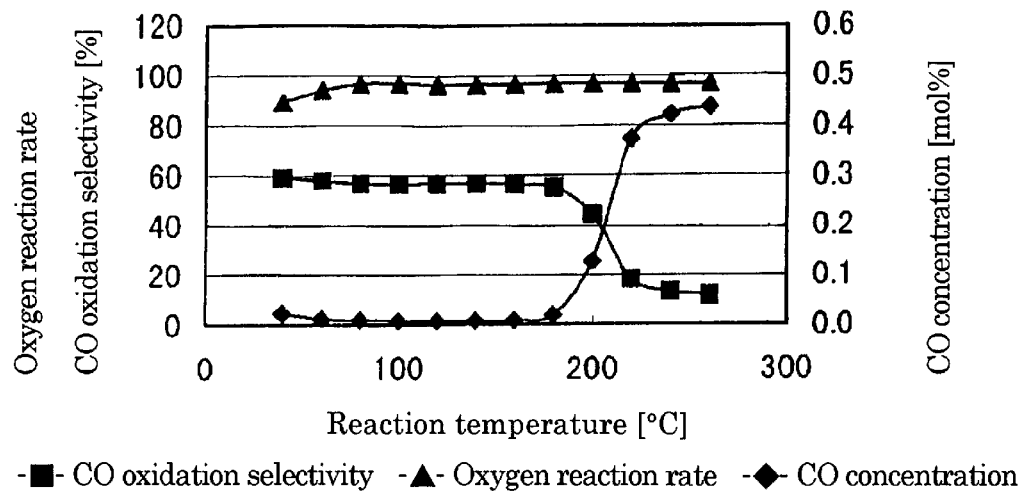
FIG. 9 is a graph showing results of performance evaluation of a catalyst used in EXAMPLE 5.

Commercially available alumina balls (average diameter: 1.5 mm; BET specific surface area: 200 to 240 $m^2/g$) were added into an aqueous solution in which a predetermined amount of chloroplatinic acid was dissolved. The resultant mixture was placed in an evaporator and dried under reduced pressure to support 1.0 wt. % of platinum on the alumina support. The Pt-supporting alumina was dried and then calcined at 400° C. The obtained Pt-supporting alumina was washed with water, dried and then added into an aqueous solution in which a predetermined amount of nickel nitrate hexahydrate was dissolved. The resultant mixture was placed in an evaporator and dried under reduced pressure to further support 1.0 wt. % of nickel on the alumina support. After drying, the Pt/Ni-supporting alumina was calcined at 400° C. to obtain an alumina-supported catalyst on which 1.0 wt. % of Ni and 1.0 wt. % of Pt were supported. The thus obtained catalyst was used in the reaction under the same conditions as in EXAMPLE 2 (SV=6,609 [1/h]). The results are shown in FIG. 9.

When using the above catalyst, no methane was produced at a temperature of 40 to 260° C., and the CO concentration of the treated gas was reduced to 0.05 mol% or lower in a reaction temperature range of about 40 to 190° C. Further, in the above temperature range, the oxygen reaction rate was 85% or higher, and the CO oxidation selectivity was about 55 to 60%.

COMPARATIVE EXAMPLE 4

Figure 10:
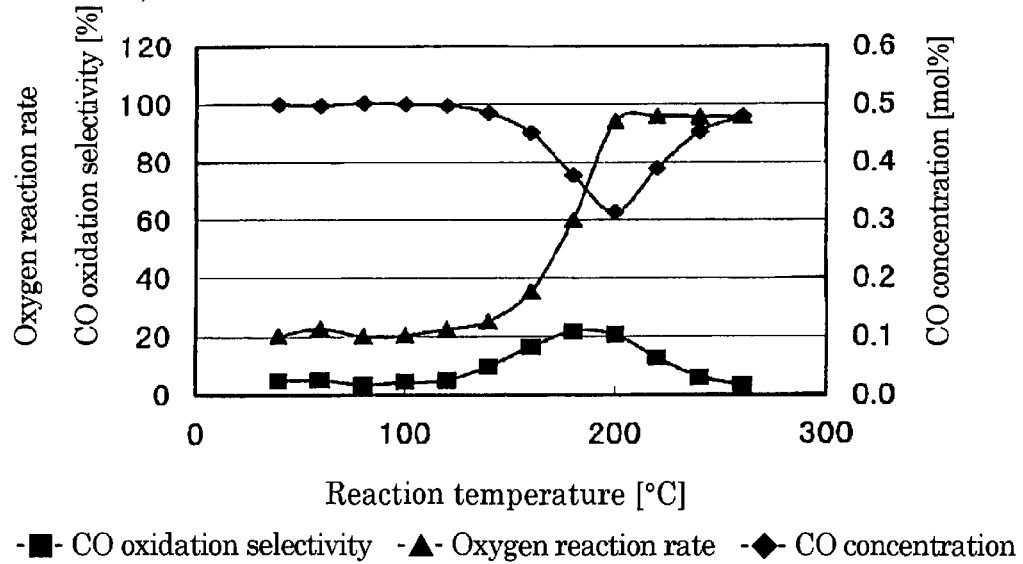
FIG. 10 is a graph showing results of performance evaluation of a catalyst used in COMPARATIVE EXAMPLE 4.

A 1.0 wt. % Ni/alumina catalyst was prepared by the same method as described in EXAMPLE 2 except that no platinum was supported on the catalyst. The thus obtained catalyst was used in the reaction under the same conditions as described in EXAMPLE 1 (SV=6,152 [1/h]). The results are shown in FIG. 10.

When using the above catalyst, although no methane was produced in a temperature range of 40 to 260° C., the oxygen reaction rate of 80% or higher could not be achieved unless the reaction temperature was raised to about 190° C. or higher. Also, it was confirmed that the CO oxidation selectivity was 22% or lower, and the CO concentration of the treated gas could not be reduced to 0.3 mol % or lower.

COMPARATIVE EXAMPLE 5

Figure 11:
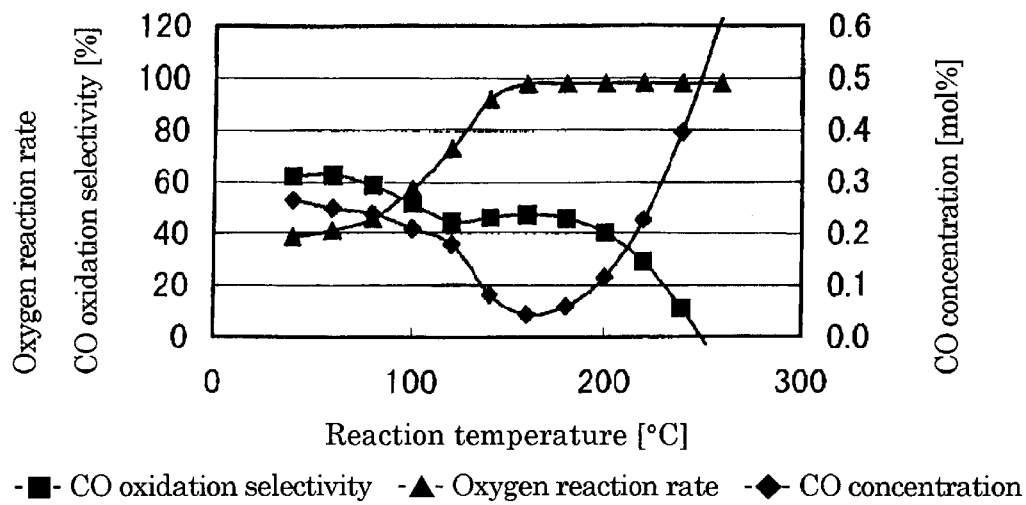
FIG. 11 is a graph showing results of performance evaluation of a catalyst used in COMPARATIVE EXAMPLE 5.

A 1.0 wt. % Pt/alumina catalyst was prepared by the same method as described in EXAMPLE 2 except that no nickel was supported on the catalyst. The thus obtained catalyst was used in the reaction under the same conditions as described in EXAMPLE 1 (SV=6,152 [1/h]). The results are shown in FIG. 11.

When using the above catalyst, the oxygen reaction rate of 80% or higher could not be achieved unless the reaction temperature was raised to about 150° C. or higher. Also, it was confirmed that the CO oxidation selectivity was 63% or lower, and the CO concentration of the treated gas was 0.1 mol % or lower in a temperature range of about 130 to 190° C., but could not be reduced to 0.04 mol % or lower in this temperature range.

COMPARATIVE EXAMPLE 6

Figure 12:
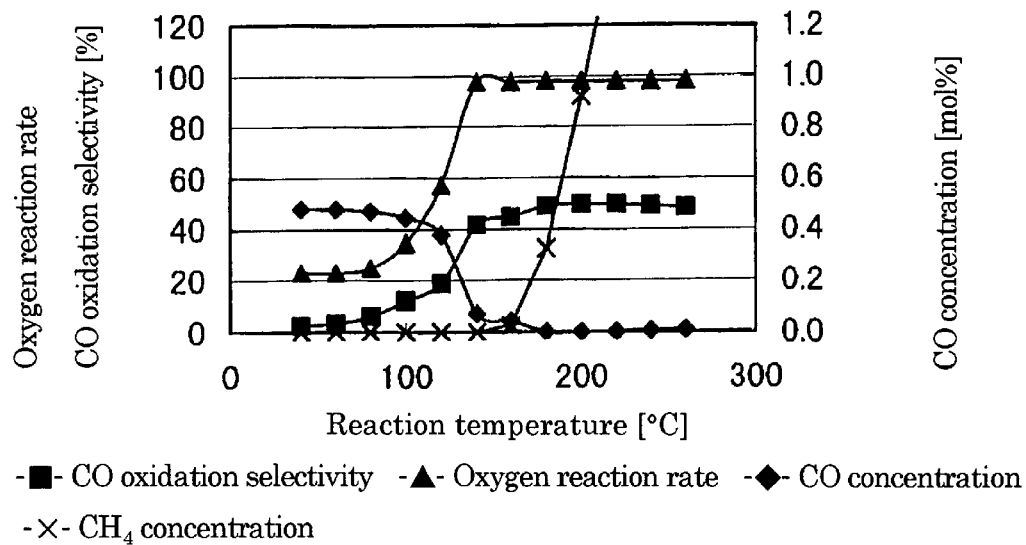
FIG. 12 is a graph showing results of performance evaluation of a catalyst used in COMPARATIVE EXAMPLE 6.

A 1.0 wt. % Ru/alumina catalyst was prepared by the same method as described in EXAMPLE 2 except that no nickel was supported on the catalyst, and acetylacetonato ruthenium was used instead of acetylacetonato platinum. The thus obtained catalyst was used in the reaction under the same conditions as described in EXAMPLE 1 (SV=6,152 [1/h]). The results are shown in FIG. 12.

When using the above catalyst, methane was produced at a temperature of 150° C. or higher, and the amount of methane produced was rapidly increased with the temperature rise. Further, the oxygen reaction rate of 80% or higher could not be achieved unless the reaction temperature was raised to about 130° C. or higher. It was also confirmed that the CO oxidation selectivity was 50% or lower, and the CO concentration of the treated gas was reduced to 0.05 mol % or lower only at a temperature of about 130° C. or higher.

Consequently, it was recognized that the thus obtained catalyst was incapable of effectively utilizing oxygen for reducing the CO concentration, and if used at an elevated temperature, a large amount of hydrogen was consumed due to production of methane or combustion of hydrogen.

EXAMPLE 6

Commercially available alumina balls (average diameter: 1.5 mm; BET specific surface area: 200 to 240 $m^2/g$) were added to an aqueous solution of copper nitrate trihydrate, and the resultant mixture was stirred. Then, an excessive amount of an aqueous sodium carbonate solution was added to the mixture to precipitate basic copper carbonate in an amount of 0.25 wt. % in terms of Cu on the alumina support. The obtained Cu-supporting alumina were filtered and then dried. Thereafter, the Cu-supporting alumina were placed in an evaporator together with an acetone solution containing acetylacetonato platinum in an amount of 0.75 wt. % in terms of Pt, and dried under reduced pressure to further support 0.5 wt. % of platinum on the alumina support. The obtained Cu/Pt-supporting alumina was dried and then calcined at 400° C. to obtain an alumina-supported catalyst on which 0.25 wt. % of Cu and 0.75 wt. % of Pt were supported.

Figure 13:
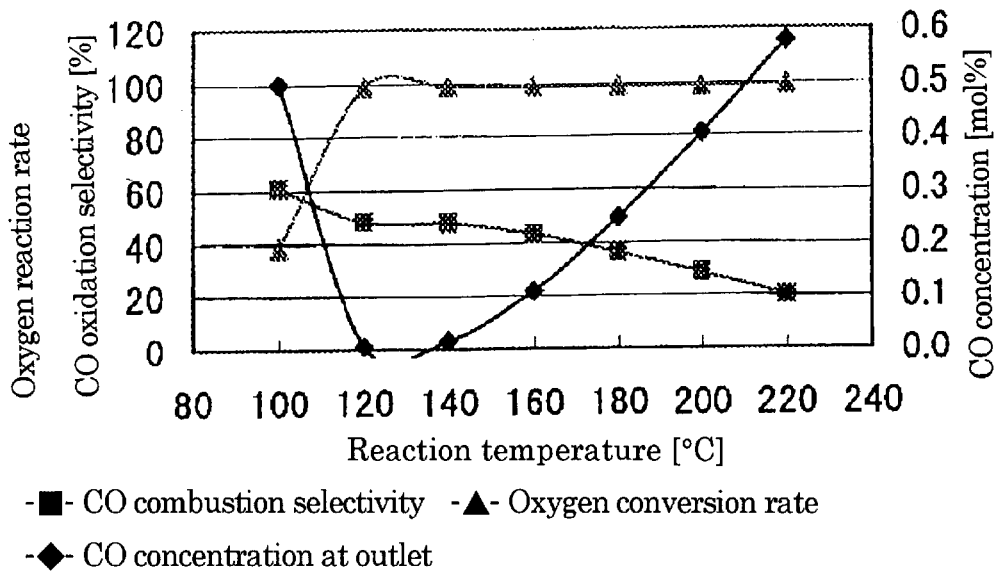
FIG. 13 is a graph showing results of performance evaluation of a catalyst used in EXAMPLE 6.

The performance evaluation of the thus obtained catalyst was conducted at a space velocity (SV) of about 5,200 [1/h] using a gas containing 1.0 mol % of CO, 1.0 mol % of $O_2$, 25 mol % of $CO_2$ and 73 mol % of $H_2$. The results are shown in FIG. 13.

When using the above catalyst, no methane was produced at a temperature of 100 to 220° C., and the CO concentration of the treated gas was reduced to 0.1 mol % or lower in a reaction temperature range of 115 to 155° C. Further, in the above temperature range, the oxygen reaction rate was 95% or higher, and the CO oxidation selectivity was about 45 to 55%.

EXAMPLE 7

Figure 14:
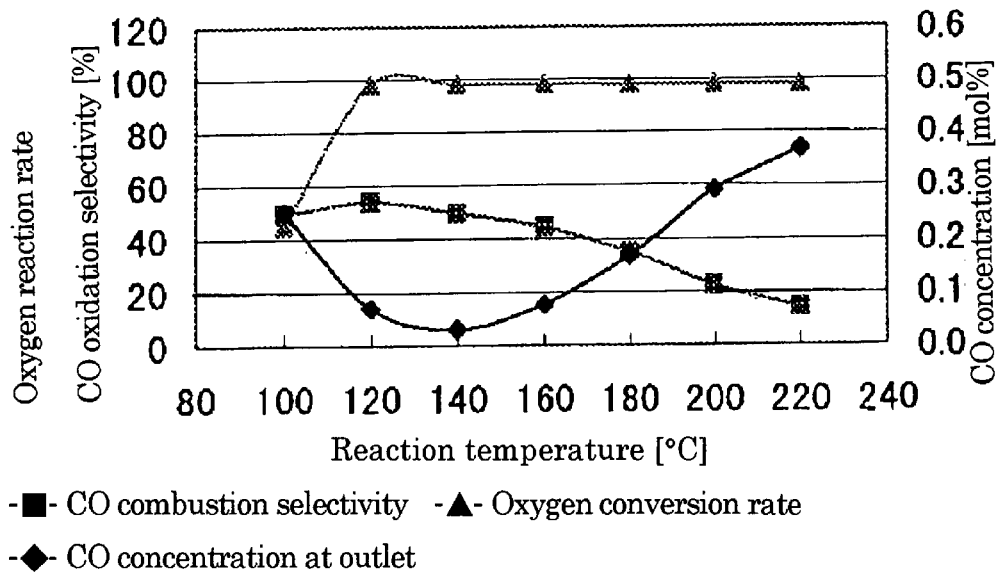
FIG. 14 is a graph showing results of performance evaluation of a catalyst used in EXAMPLE 7.

An alumina-supported catalyst on which 0.5 wt. % of Cu and 0.5 wt. % of Pt were supported, was prepared by the same method as described in EXAMPLE 6. The performance evaluation of the thus obtained catalyst was conducted at a space velocity (SV) of about 6,200 [1/h] using a gas containing 0.5 mol % of CO, 0.5 mol % of $O_2$, 25 mol % of $CO_2$ and 74 mol % of $H_2$. The results are shown in FIG. 14. When using the above catalyst, no methane was produced at a temperature of 100 to 220° C., and the CO concentration of the treated gas was reduced to 0.1 mol % or lower in the reaction temperature range of 120 to 160° C. Further, in the above reaction temperature range, the oxygen reaction rate was 95% or higher, and the CO oxidation selectivity was 45 to 55%.

EXAMPLE 8

Figure 15:
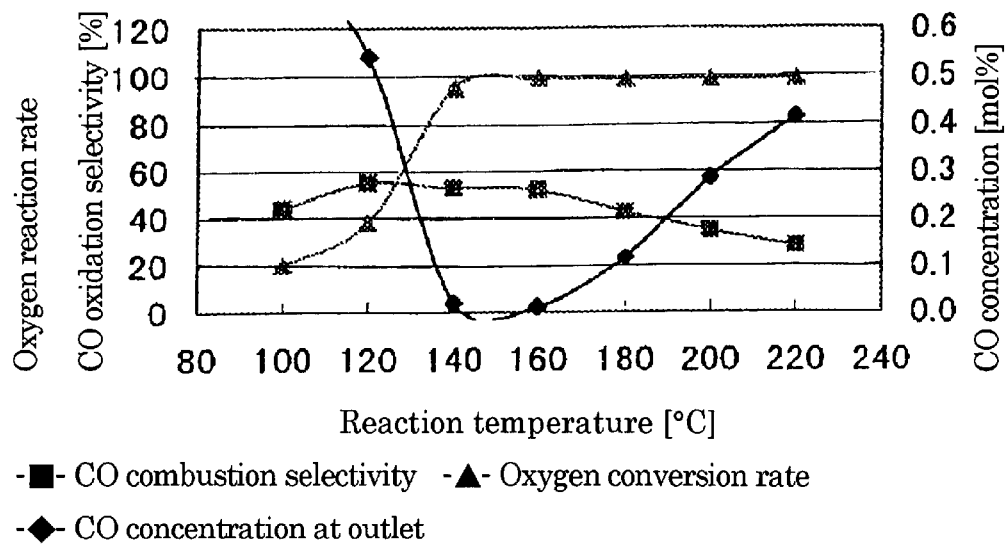
FIG. 15 is a graph showing results of performance evaluation of a catalyst used in EXAMPLE 8.

An alumina-supported catalyst on which 0.75 wt. % of Cu and 0.25 wt. % of Pt were supported, was prepared by the same method as described in EXAMPLE 6. The performance evaluation of the thus obtained catalyst was conducted at a space velocity (SV) of about 6,200 [1/h]) using a gas containing 1.0 mol % of CO, 1.0 mol % of $O_2$, 25 mol % of $CO_2$ and 73 mol % of $H_2$. The results are shown in FIG. 15. When using the above catalyst, no methane was produced at a temperature of 100 to 220° C., and the CO concentration of the treated gas was reduced to 0.1 mol % or lower in the reaction temperature range of 130 to 175° C. Further, in the above reaction temperature range, the oxygen reaction rate was 95% or higher, and the CO oxidation selectivity was 45 to 55%.

EXAMPLE 9

177 g of sodium carbonate (anhydride) and 1,000 ml (milliliters) of ion-exchanged water were charged into a 5-liter round bottom flask, dissolved and then heated to 40° C. A solution prepared by dissolving 315 g of copper sulfate (pentahydrate) and 19.7 g of boric acid in 800 ml of ion-exchanged water and adjusted to 40° C., was poured into the above obtained sodium carbonate solution. Then, the obtained solution was mixed with a slurry prepared by dispersing 77.0 g of zinc oxide in 300 ml of ion-exchanged water, and a carbon dioxide gas was immediately blown into the resultant mixture at a feed rate of 6 liters per hour. After one hour, the mixture was heated to 80° C. and maintained at that temperature for 30 minutes. The feed of the carbon dioxide gas was stopped after 2 hours from the initiation of supply thereof. Then, after cooling to 60° C., the obtained mixture was mixed with a slurry produced by mixing a solution prepared by dissolving 51.4 g of aluminum sulfate in 150 ml of ion-exchanged water with a solution prepared by dissolving 21.9 g of sodium hydroxide in 160 ml of ion-exchanged water. The resultant mixed slurry was stirred for 20 minutes and then filtered. The obtained solids were washed with 12 liters of a 0.05% sodium hydroxide aqueous solution and 3 liters of ion-exchanged water. The solids were then dried at 80° C. to obtain a Cu—Zn—Al catalyst. 20 g of the thus obtained Cu—Zn—Al catalyst was immersed in 50 ml of an acetone solution containing 0.158 g of acetylacetonato platinum, and the resultant mixture was distilled at a temperature of 30 to 50° C. under reduced pressure to remove acetone therefrom. Thereafter, the obtained solids were calcined at 360° C. for 2 hours to obtain a Cu—Zn—Al catalyst on which 0.5 wt. % of Pt was further supported. The obtained catalyst was shaped into tablets having a bulk density of 2.5 g/ml using a tablet machine, pulverized, and then passed through a sieve to obtain uniform catalyst particles having a diameter of 0.5 to 1.0 mm. The catalyst was used in the reaction.

Figure 16:
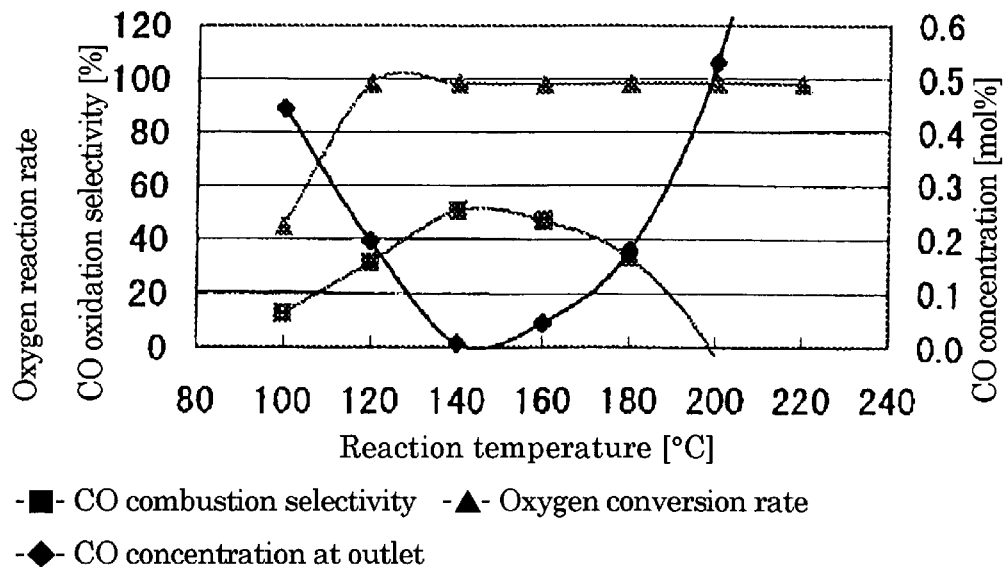
FIG. 16 is a graph showing results of performance evaluation of a catalyst used in EXAMPLE 9.

The performance evaluation of the thus obtained catalyst was conducted at a space velocity (SV) of about 11,500 [1/h] using a gas containing 0.5 mol % of CO, 0.5 mol % of $O_2$, 25 mol % of $CO_2$ and 74 mol % of $H_2$. The results are shown in FIG. 16. When using the above catalyst, no methane was produced at a temperature of 100 to 220° C., and the CO concentration of the treated gas was reduced to 0.1 mol % or lower in the reaction temperature range of 130 to 170° C. Further, as to the percentage of oxygen reacted with CO in the above reaction temperature range, the oxygen reaction (conversion) rate was 95% or higher, and the CO oxidation selectivity was 45 to 55%.

COMPARATIVE EXAMPLE 7

Figure 17:
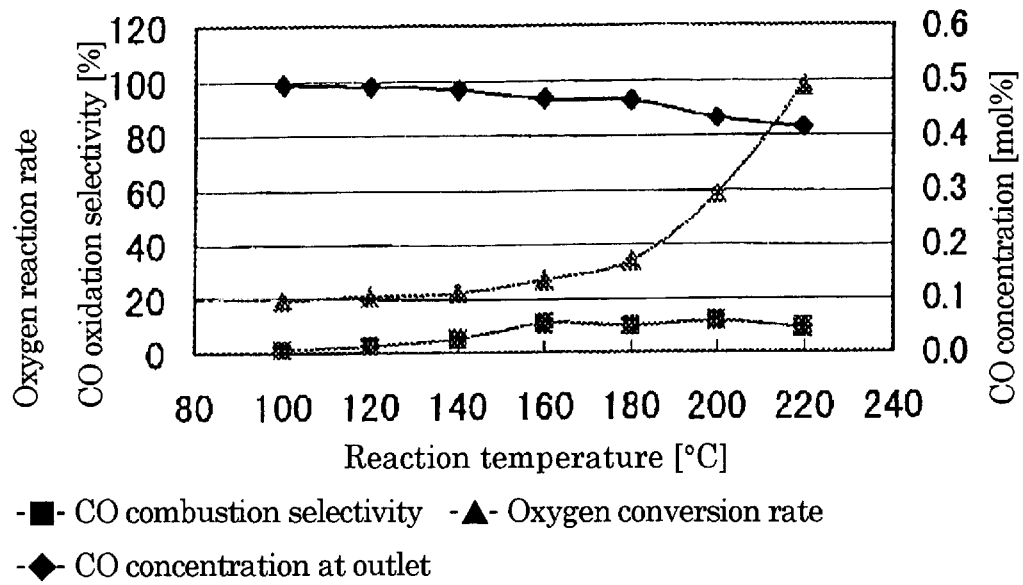
FIG. 17 is a graph showing results of performance evaluation of a catalyst used in COMPARATIVE EXAMPLE 7.

A 1.0 wt. % Cu/alumina catalyst was prepared by the same method as described in EXAMPLE 6 except that no platinum was supported on the catalyst. The thus obtained catalyst was used in the reaction under the same conditions as described in EXAMPLE 7. The results are shown in FIG. 17.

When using the above catalyst, although no methane was produced in a temperature range of 100 to 220° C., the oxygen reaction rate of 80% or higher could not be achieved unless the reaction temperature was raised to about 210° C. or higher. Also, it was confirmed that the CO oxidation selectivity was 12% or lower, and the CO concentration of the treated gas could not be reduced to 0.4 mol % or lower.

COMPARATIVE EXAMPLE 8

Figure 18:
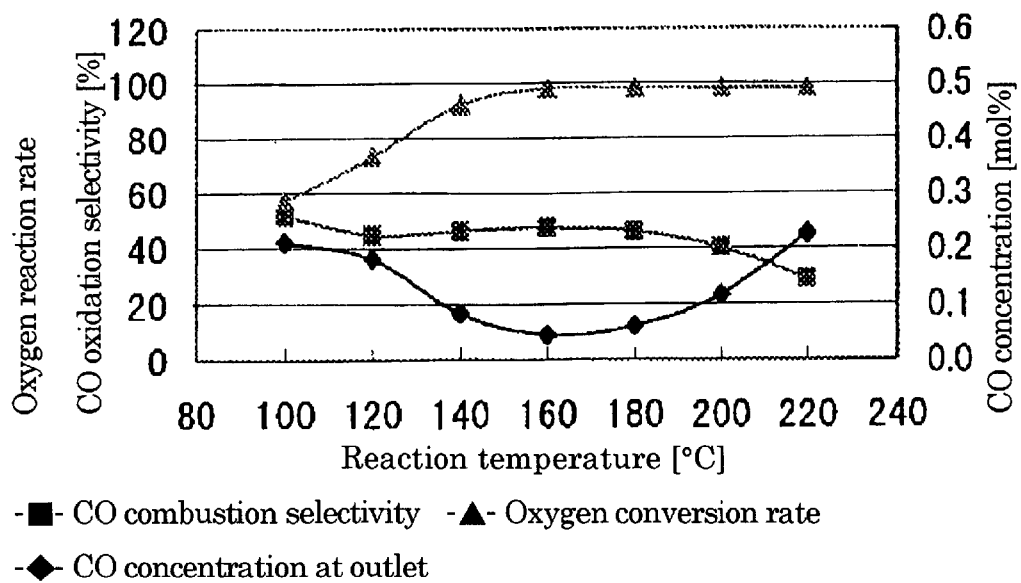
FIG. 18 is a graph showing results of performance evaluation of a catalyst used in COMPARATIVE EXAMPLE 8.

A 1.0 wt. % Pt/alumina catalyst was prepared by the same method as described in EXAMPLE 6 except that no copper was supported on the catalyst. The thus obtained catalyst was used in the reaction under the same conditions as described in EXAMPLE 7. The results are shown in FIG. 18.

When using the above catalyst, although no methane was produced at a temperature of 100 to 220° C., the oxygen reaction rate of 95% or higher could not be achieved unless the reaction temperature was raised to about 150° C. or higher. Also, it was confirmed that the CO oxidation selectivity was about 50%, but the CO concentration of the treated gas could not be reduced to 0.1 mol % or lower unless the reaction temperature was raised to about 140 to 190° C.

COMPARATIVE EXAMPLE 9

Figure 19:
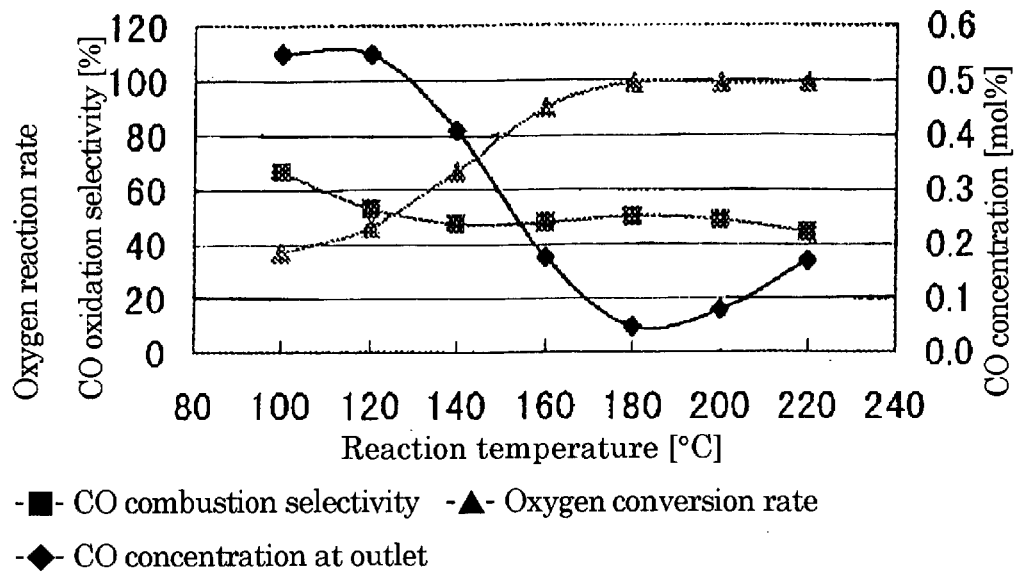
FIG. 19 is a graph showing results of performance evaluation of a catalyst used in COMPARATIVE EXAMPLE 9.

The 1.0 wt. % Pt/alumina catalyst prepared in COMPARATIVE EXAMPLE 8 was used in the reaction under the same conditions as described in EXAMPLE 6. The results are shown in FIG. 19.

When using the above catalyst, although no methane was produced at a temperature of 100 to 220° C., the oxygen reaction rate of 95% or higher could not be achieved unless the reaction temperature was raised to about 170° C. or higher. Also, it was confirmed that the CO oxidation selectivity was about 50%, but the CO concentration of the treated gas could not be reduced to 0.1 mol % or lower unless the reaction temperature was raised to about 170 to 200° C.

COMPARATIVE EXAMPLE 10

Figure 20:
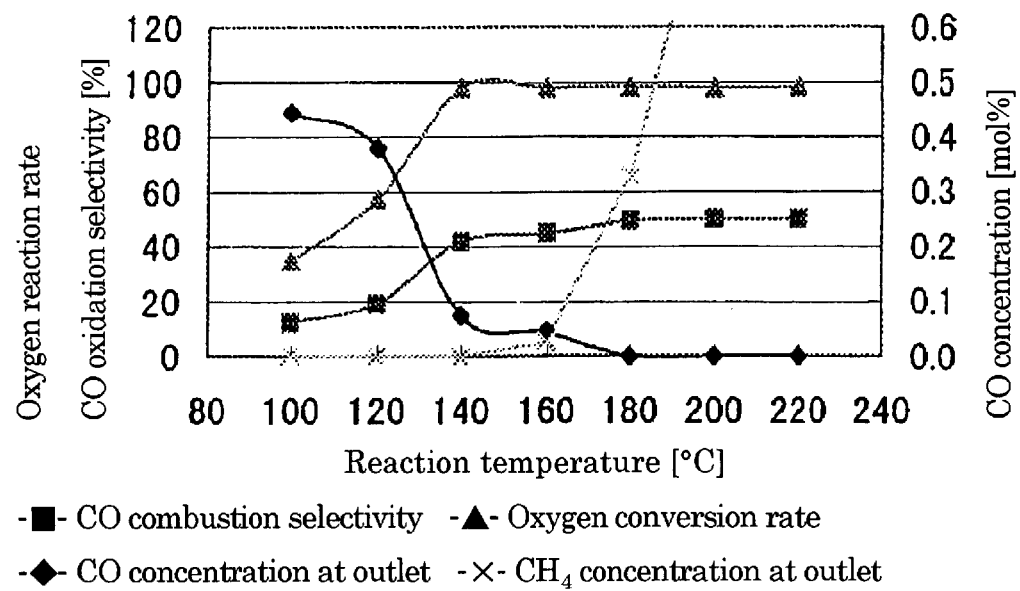
FIG. 20 is a graph showing results of performance evaluation of a catalyst used in COMPARATIVE EXAMPLE 10.

A 1.0 wt. % Ru/alumina catalyst was prepared by the same method as described in EXAMPLE 6 except that no copper was supported on the catalyst, and acetylacetonato ruthenium was used instead of acetylacetonato platinum. The thus obtained catalyst was used in the reaction under the same conditions as described in EXAMPLE 7. The results are shown in FIG. 20. When using the above catalyst, methane was produced at a temperature of 150° C. or higher, and the amount of methane produced was rapidly increased with the temperature rise. Further, the oxygen reaction rate of 95% or higher could not be achieved unless the reaction temperature was raised to about 135° C. or higher. Also, it was confirmed that the CO oxidation selectivity was about 50%, but the CO concentration of the treated gas could not be reduced to 0.1 mol % or lower unless the reaction temperature was raised to about 140° C. or higher.

COMPARATIVE EXAMPLE 11

Figure 21:
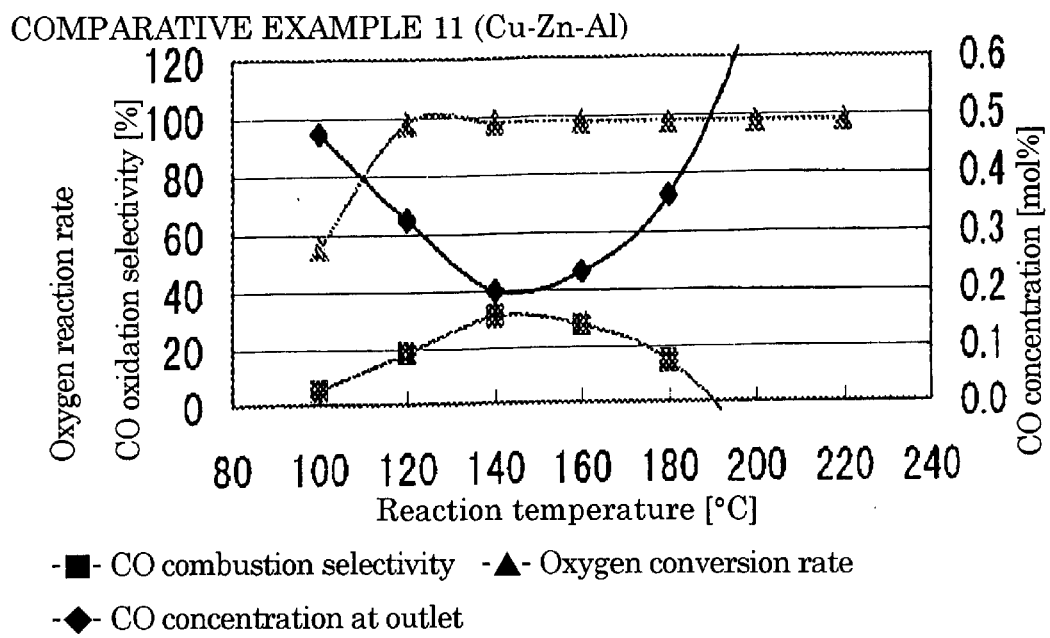
FIG. 21 is a graph showing results of performance evaluation of a catalyst used in COMPARATIVE EXAMPLE 11.

A Cu—Zn—Al catalyst was prepared by the same method as described in EXAMPLE 9 except that no platinum was supported on the catalyst. The thus obtained catalyst was classified using a sieve to obtain uniform particles and then used in the reaction under the same conditions as described in EXAMPLE 9. The results are shown in FIG. 21.

When using the above catalyst, no methane was produced at a temperature of 100 to 220° C., and the oxygen reaction rate of 95% or higher was achieved at a temperature of about 115° C. or higher. However, the CO oxidation selectivity was 31% or lower, and the CO concentration of the treated gas could not be reduced to 0.2 mol % or lower.

EXAMPLE 10

An aqueous solution in which manganese nitrate hexahydrate was dissolved in an amount of 0.5 wt. % in terms of Mn, and commercially available alumina balls (average diameter: 1.5 mm; BET specific surface area: 200 to 240 $m^2/g$) were placed in an evaporator, and dried under reduced pressure to support 0.5 wt. % of Mn on the alumina support, followed by further drying. Then, an acetone solution containing acetylacetonato platinum in an amount of 0.5 wt. % in terms of Pt was placed in an evaporator together with the thus obtained Mn-supporting alumina, and dried under reduced pressure to further support 0.5 wt. % of platinum on the alumina support. After drying, the obtained Mn/Pt-supporting alumina was calcined at 360° C. to obtain an alumina-supported catalyst on which 0.5 wt. % of Mn and 0.5 wt. % of Pt were supported.

Figure 22:
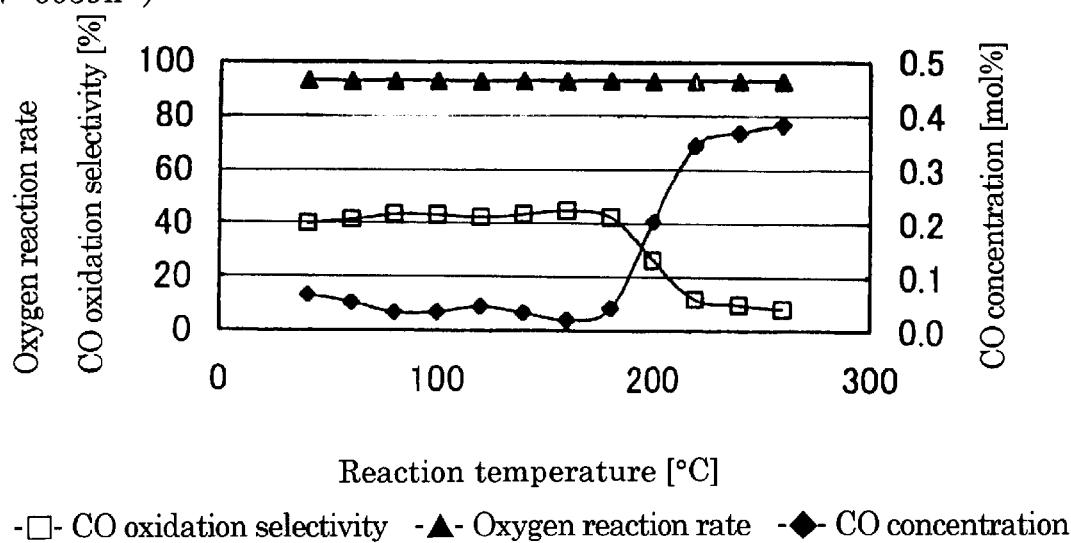
FIG. 22 is a graph showing results of performance evaluation of a catalyst used in EXAMPLE 10.

The results of performance evaluation (SV=6,039 [1/h]) of the thus obtained catalyst are shown in FIG. 22. When using the above catalyst, no methane was produced at a temperature of 40 to 260° C., and the CO concentration of the treated gas was reduced to 0.05 mol % or lower in a reaction temperature range of about 70 to 190° C. Further, in the above temperature range, the oxygen reaction rate was 90% or higher, and the CO oxidation selectivity was about 40 to 45%.

EXAMPLE 11

Figure 23:
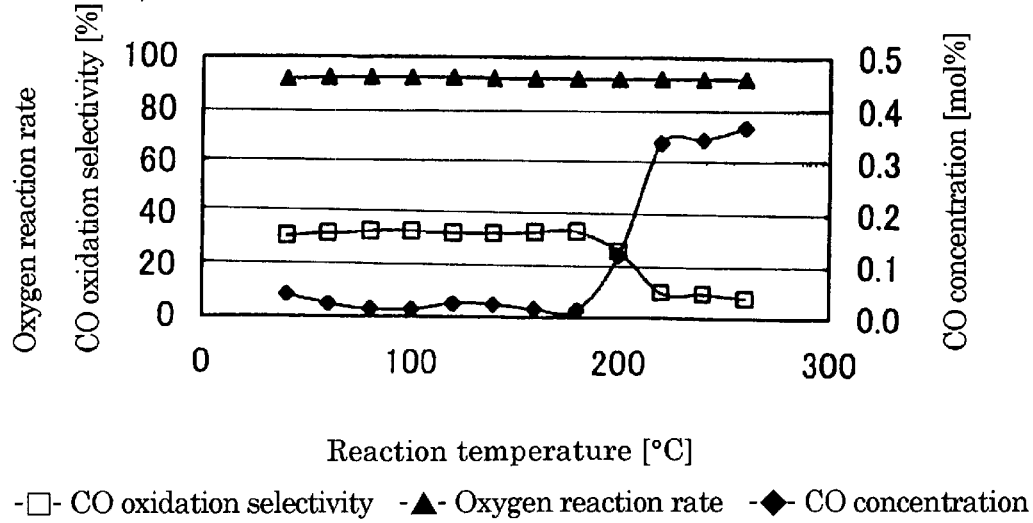
FIG. 23 is a graph showing results of performance evaluation of a catalyst used in EXAMPLE 11.

The reaction was conducted under the same conditions as described in EXAMPLE 10 except that the molar ratio of $O_2$ to CO in the raw gas was changed to 1.5. The results of performance evaluation (SV=6,039 [1/h]) of the catalyst are shown in FIG. 23.

When such a raw gas having a molar ratio Of $O_2$ to CO of 1.5 was treated with the catalyst, the CO concentration of the treated gas was reduced to 0.05 mol % or lower in a reaction temperature range of about 40 to 190° C. Further, in the above temperature range, the oxygen reaction rate was 90% or higher, and the CO oxidation selectivity was about 30 to 35%.

COMPARATIVE EXAMPLE 12

Figure 24:
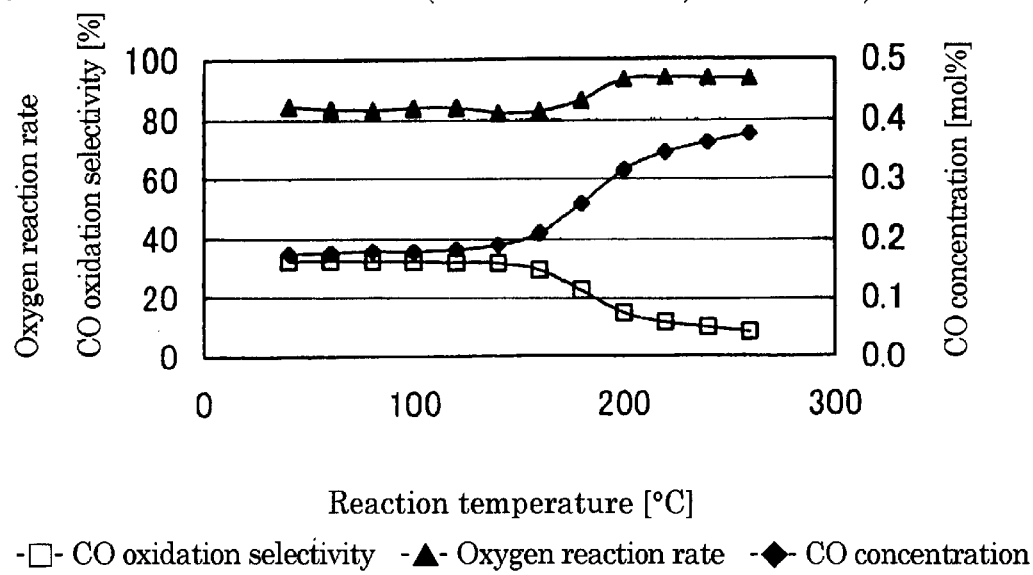
FIG. 24 is a graph showing results of performance evaluation of a catalyst used in COMPARATIVE EXAMPLE 12.

A 0.5 wt. % Mn/alumina catalyst was prepared by the same method as described in EXAMPLE 10 except that no platinum was supported on the catalyst. The thus obtained catalyst was used in the reaction under the same conditions as described in EXAMPLE 10 (SV=6,039 [1/h]). The results are shown in FIG. 24.

When using the above catalyst, although no methane was produced at a temperature of 40 to 260° C., the CO concentration of the treated gas could not be reduced to 0.15 mol % or lower, and the CO oxidation selectivity was 40% or lower

COMPARATIVE EXAMPLE 13

Figure 25:
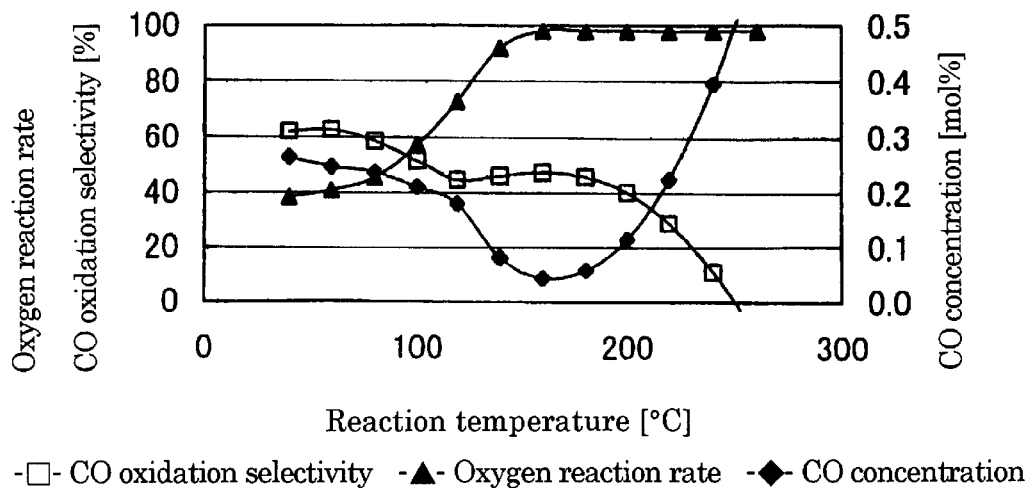
FIG. 25 is a graph showing results of performance evaluation of a catalyst used in COMPARATIVE EXAMPLE 13.

A 1.0 wt. % Pt/alumina catalyst was prepared by the same method as described in EXAMPLE 10 except that no manganese was supported on the catalyst. The thus obtained catalyst was used in the reaction under the same conditions as described in EXAMPLE 10 (SV =6,152 [1/h]). The results are shown in FIG. 25.

When using the above catalyst, the oxygen reaction rate of 80% or higher could not be achieved unless the reaction temperature was raised to about 150° C. or higher. Also, it was confirmed that the CO concentration of the treated gas could be reduced to 0.1 mol % or lower only when the reaction temperature was in the limited range of about 130 to 190° C.

COMPARATIVE EXAMPLE 14

Figure 26:
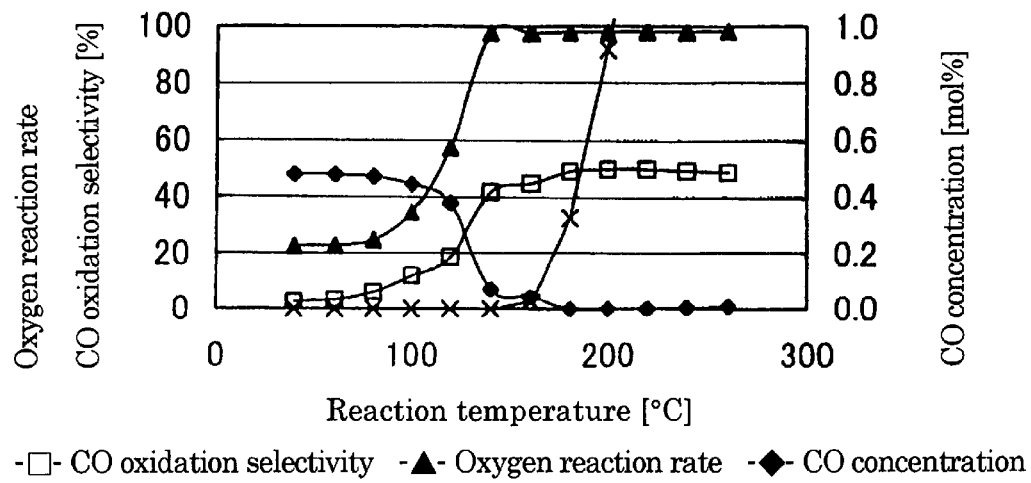
FIG. 26 is a graph showing results of performance evaluation of a catalyst used in COMPARATIVE EXAMPLE 14.

A 1.0 wt. % Ru/alumina catalyst was prepared by the same method as described in EXAMPLE 10 except that no manganese was supported on the catalyst, and acetylacetonato ruthenium was used instead of acetylacetonato platinum. The thus obtained catalyst was used in the reaction under the same conditions as described in EXAMPLE 10 (SV=6,152 [1/h]). The results are shown in FIG. 26.

When using the above catalyst, methane was produced at a temperature of 150° C. or higher, and the amount of methane produced was rapidly increased with the temperature rise. Further, the oxygen reaction rate of 80% or higher could not be achieved unless the reaction temperature was raised to about 130° C. or higher. Further, the CO concentration of the treated gas was reduced to 0.05 mol % or lower only at a temperature of about 130° C. or higher.

Consequently, it was recognized that the catalyst was incapable of effectively utilizing oxygen for reducing the CO concentration at a low temperature, and if used at an elevated temperature, a large amount of hydrogen was consumed due to production of methane or combustion of hydrogen.

What is claimed is:

1. A process for reducing a concentration of carbon monoxide in a hydrogen-containing gas adapted for use in fuel cells, comprising the step of contacting the carbon monoxide in said hydrogen-containing gas adapted for use in fuel cells with oxygen at a temperature of 30 to 200° C. in the presence of a catalyst consisting of cobalt and platinum, supported on a carrier, such that the amount of the oxygen contacted is 0.5 to 2 times the amount of the carbon monoxide contained in the hydrogen-containing gas.

2. The process according to claim 1, wherein the amount of said catalyst used is 100 to 100,000 l/h in terms of a gas hourly space velocity.

3. A process for reducing a concentration of carbon monoxide in a hydrogen-containing gas adapted for use in fuel cells, comprising the step of contacting the carbon monoxide in said hydrogen-containing gas adapted for use in fuel cells with oxygen at a temperature of 40 to 200° C. in the presence of a catalyst consisting of nickel and platinum, supported on a carrier, such that the amount of the oxygen contacted is 0.5 to 2 times the amount of the carbon monoxide contained in the hydrogen-containing gas.

4. The process according to claim 3, wherein the amount of said catalyst used is 100 to 100,000 l/h in terms of a gas hourly space velocity.

5. A process for reducing a concentration of carbon monoxide in a hydrogen-containing gas adapted for use in fuel cells, comprising the step of contacting the carbon monoxide in said hydrogen-containing gas adapted for use in fuel cells with oxygen at a temperature of 100 to 200° C. in the presence of a catalyst consisting of copper and platinum, supported on a carrier, such that the amount of the oxygen contacted is 0.5 to 4 times the amount of the carbon monoxide contained in the hydrogen-containing gas.

6. The process according to claim 5, wherein the amount of said catalyst used is 100 to 100,000 l/h in terms of a gas hourly space velocity.

7. A process for reducing a concentration of carbon monoxide in a hydrogen-containing gas adapted for use in fuel cells, comprising the step of contacting the carbon monoxide in said hydrogen-containing gas adapted for use in fuel cells with oxygen at a temperature of 40 to 200° C. in the presence of a catalyst consisting of manganese and platinum, supported on a carrier, such that the amount of the oxygen contacted is 0.5 to 2 times the amount of the carbon monoxide contained in the hydrogen-containing gas.

8. The process according to claim 7, wherein the amount of said catalyst used is 100 to 100,000 l/h in terms of a gas hourly space velocity.

9. A process for reducing a concentration of carbon monoxide in a hydrogen-containing gas adapted for use in fuel cells, comprising the steps of contacting the carbon monoxide in said hydrogen-containing gas adapted for use in fuel cells with oxygen at a temperature of 40 to 200° C. in the presence of a catalyst consisting of (a) at least one selected from the group consisting of cobalt, nickel, copper and manganese, and also (b) platinum, the catalyst being supported on a carrier, such that the amount of the oxygen contacted is 0.5 to 2 times the amount of the carbon monoxide contained in the hydrogen-containing gas.

10. A process for reducing a concentration of carbon monoxide in a hydrogen-containing gas adapted for use in fuel cells, comprising the steps of contacting the carbon monoxide in said hydrogen-containing gas adapted for use in fuel cells with oxygen at a temperature of 40 to 200° C. in the presence of a catalyst consisting of (a) at least one selected from the group consisting of cobalt, nickel, copper and manganese, and also (b) platinum, the catalyst being in a form of a coprecipitated catalyst, such that the amount of the oxygen contacted is 0.5 to 2 times the amount of the carbon monoxide contained in the hydrogen-containing gas.

11. A process for reducing a concentration of carbon monoxide in a hydrogen-containing gas adapted for use in fuel cells, comprising the steps of contacting the carbon monoxide in said hydrogen-containing gas adapted for use in fuel cells with oxygen at a temperature of 40 to 200° C. in the presence of a catalyst, the catalyst consisting of (a) at least one selected from the group consisting of cobalt, nickel, copper and manganese, and also (b) platinum, such that the amount of the oxygen contacted is 0.5 to 2 times the amount of the carbon monoxide contained in the hydrogen-containing gas.

12. A process for producing a hydrogen-containing gas for fuel cells, including reducing a concentration of carbon monoxide in the hydrogen-containing gas for fuel cells, comprising:

(a) subjecting hydrocarbons or methanol to steam-reforming or partial oxidation to produce a hydrogen-containing gas, the hydrogen-containing gas including carbon monoxide;

(b) contacting the carbon monoxide in said hydrogen-containing gas with oxygen at a temperature of 40 to 200° C. in the presence of a catalyst consisting of (1) at least one selected from the group consisting of cobalt, nickel, copper and manganese, and also (2) platinum, such that the amount of oxygen contacted is 0.5 to 2 times the amount of the carbon monoxide contained in the hydrogen-containing gas, thereby providing an oxygen-contacted, hydrogen-containing gas ; and (c) adapting the hydrogen-containing gas from (b) for use in fuel cells.

13. The process according to claim 12, wherein said catalyst consists of cobalt and platinum.

14. The process according to claim 13, wherein said catalyst is supported on a carrier.

15. The process according to claim 13, wherein said catalyst is in a form of a coprecipitated catalyst of cobalt and platinum.

16. The process according to claim 12, wherein said catalyst consists of nickel and platinum.

17. The process according to claim 16, wherein said catalyst is supported on a carrier.

18. The process according to claim 16, wherein said catalyst is in a form of a coprecipitated catalyst of nickel and platinum.

19. The process according to claim 12, wherein said catalyst consists of copper and platinum.

20. The process according to claim 19, wherein said catalyst is supported on a carrier.

21. The process according to claim 19, wherein said catalyst is in a form of a coprecipitated catalyst of copper and platinum.

22. The process according to claim 12, wherein said catalyst consists of manganese and platinum.

23. The process according to claim 22, wherein said catalyst is supported on a carrier.

24. The process according to claim 19, wherein said catalyst is in a form of a coprecipitated catalyst of manganese and platinum.

* * * * *